United States Patent
Lu et al.

(10) Patent No.: US 12,505,203 B2
(45) Date of Patent: Dec. 23, 2025

(54) CONTAINER-BASED TASK EXECUTION METHOD AND APPARATUS

(71) Applicant: Alipay (Hangzhou) Information Technology Co., Ltd., Hangzhou (CN)

(72) Inventors: Yu Fei Lu, Hangzhou (CN); Ting Cheng Wu, Hangzhou (CN); Xing Yu Chen, Hangzhou (CN); Xiao Long Hu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 238 days.

(21) Appl. No.: 18/571,877

(22) PCT Filed: Jul. 12, 2022

(86) PCT No.: PCT/CN2022/105249
§ 371 (c)(1),
(2) Date: Dec. 19, 2023

(87) PCT Pub. No.: WO2023/024739
PCT Pub. Date: Mar. 2, 2023

(65) Prior Publication Data
US 2024/0281520 A1     Aug. 22, 2024

(30) Foreign Application Priority Data
Aug. 24, 2021   (CN) .......................... 202110977593.7

(51) Int. Cl.
*G06F 21/53* (2013.01)
*G06F 21/54* (2013.01)
*G06F 21/56* (2013.01)

(52) U.S. Cl.
CPC .............. *G06F 21/53* (2013.01); *G06F 21/54* (2013.01); *G06F 21/565* (2013.01)

(58) Field of Classification Search
CPC .......... G06F 21/53; G06F 21/54; G06F 21/565
(Continued)

(56) References Cited

U.S. PATENT DOCUMENTS 9,846,772 B1 * 12/2017 Satish ................. H04L 63/1416
10,104,185 B1 * 10/2018 Sharifi Mehr ...... G06F 9/45558
(Continued)

FOREIGN PATENT DOCUMENTS

CN          106487815 A       3/2017
CN          109347814 A       2/2019
(Continued)

OTHER PUBLICATIONS

The International Search Report and Written Opinion of the International Searching Authority for International Application No. PCT/CN2022/105249 mailed on Oct. 10, 2022.

*Primary Examiner* — Thanh T Le
(74) *Attorney, Agent, or Firm* — Womble Bond Dickinson (US) LLP

(57) ABSTRACT

Embodiments of this specification provide a container-based task execution method and apparatus. The method can be performed by a container management platform. When receiving a task description file that is for a to-be-executed task and that is submitted by a user, the container management platform can determine whether a first identifier of a first image file carried in the description file is in a whitelist, where the first identifier can be added to the whitelist when it is determined that specified executable file information included in the first image file is secure; and if the first identifier is in the whitelist, considers that the to-be-executed task is secure, and can execute the to-be-executed task based on a container group created by using the task description file and the specified executable file information included in the first image file.

20 Claims, 4 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 11,062,022 | B1* | 7/2021 | Kalamkar | G06F 9/45558 |
| 11,531,846 | B1* | 12/2022 | Bodapati | G06N 20/00 |
| 11,573,816 | B1* | 2/2023 | Featonby | H04L 67/10 |
| 11,704,408 | B1* | 7/2023 | Ciubotariu | G06F 21/565 |
| | | | | 726/23 |
| 11,775,640 | B1* | 10/2023 | Sathe | H04L 63/1416 |
| | | | | 726/24 |
| 12,080,046 | B2* | 9/2024 | Saraee | G06N 3/0475 |
| 2013/0276057 | A1* | 10/2013 | Smith | G06F 21/575 |
| | | | | 726/1 |
| 2015/0180884 | A1* | 6/2015 | Bhargava | H04L 63/1416 |
| | | | | 726/4 |
| 2016/0072818 | A1* | 3/2016 | Quong | H04W 12/128 |
| | | | | 726/27 |
| 2017/0116415 | A1* | 4/2017 | Stopel | G06F 21/52 |
| 2017/0134407 | A1* | 5/2017 | Mason | H04L 63/0236 |
| 2017/0223046 | A1* | 8/2017 | Singh | H04L 63/1491 |
| 2017/0293762 | A1* | 10/2017 | Karhunen | G06F 9/54 |
| 2017/0300311 | A1* | 10/2017 | Vasquez Lopez | G06F 8/63 |
| 2018/0129803 | A1 | 5/2018 | Levin et al. | |
| 2018/0349610 | A1* | 12/2018 | Gupta | G06F 9/5077 |
| 2020/0218798 | A1* | 7/2020 | Kosaka | G06F 9/451 |
| 2020/0301726 | A1* | 9/2020 | Singh | G06F 9/5055 |
| 2021/0144145 | A1* | 5/2021 | Ding | H04L 63/20 |
| 2022/0414478 | A1* | 12/2022 | Karri | G06N 5/025 |

FOREIGN PATENT DOCUMENTS

| | | |
|---|---|---|
| CN | 111523111 A | 8/2020 |
| CN | 112306640 A | 2/2021 |
| CN | 113672353 A | 11/2021 |

* cited by examiner

Image file

Meta information: specified executable file
information
      parameter information File set: executable file
      configuration file
      basic library file

FIG. 3-1

```
apiVersion: batch/v1
kind: Job
metadata:
  name: job_name
    containers:
    - name: job_name
      image: user_image
      command: ["/home/admin/bin/exe"]
      args: ["job_arg1", "job_arg2"]
```

FIG. 3-2

CONTAINER-BASED TASK EXECUTION METHOD AND APPARATUS

This specification is a national stage application filed under 35 U.S.C. 371 based on International Patent Application No. PCT/CN2022/105249, filed Jul. 12, 2022, which claims priority to Chinese Patent Application No. 2021109775937, filed with the China National Intellectual Property Administration on Aug. 24, 2021 and entitled "CONTAINER-BASED TASK EXECUTION METHOD AND APPARATUS", which is incorporated herein by reference in its entirety.

TECHNICAL FIELD

One or more embodiments of this specification relate to the field of computer technologies, and in particular, to a container-based task execution method and apparatus.

BACKGROUND

Kubernetes (K8s) is an open-source system for automating deployment, scaling, and management of containerized applications. A container management platform (briefly referred to as a K8s platform) to which a K8s environment is applied can be applied to management of containerized applications on a plurality of hosts in a cloud platform, and can be further applied to containerized applications in other scenarios. After a user submits a task to the K8s platform, the K8s platform can automatically allocate a container to execute the task submitted by the user. The container is responsible for isolating an internal environment from an external environment, so that an execution process of the task is not affected by the external environment. In the execution process of the task, privacy data in a service party device may be further invoked. Currently, in a process of executing a task by using the K8s platform, security needs to be further improved, and a malicious task needs to be blocked.

Therefore, it is expected that there can be an improved solution to effectively block the malicious task and improve security of the task executed in the container.

SUMMARY

One or more embodiments of this specification describe a container-based task execution method and apparatus, to effectively and conveniently block a malicious task and improve security of a task executed in a container. Specific technical solutions are as follows:

According to a first aspect, an embodiment provides a container-based task execution method, including:
  receiving a submitted task description file for a to-be-executed task, where the task description file includes a first identifier of a first image file; and
  when it is determined that the first identifier is in a whitelist, creating a container group by using the task description file, and executing the to-be-executed task based on the container group and specified executable file information included in the first image file.

The first identifier is pre-added to the whitelist when it is determined that the specified executable file information included in the first image file is secure.

In an implementation, the step of receiving a submitted task description file for a to-be-executed task includes:

receiving the task description file that is for the to-be-executed task and that is obtained based on an input operation performed by a user.

In an implementation, the method further includes:
  when it is determined that the first identifier is not in the whitelist, rejecting execution of the to-be-executed task.

In an implementation, before the step of creating a container group by using the task description file, and executing the to-be-executed task based on the container group and specified executable file information included in the first image file, the method further includes:
  detecting whether there is specified executable file information in the task description file; and
  if there is no specified executable file information in the task description file, creating a container group by using the task description file, and executing the to-be-executed task based on the container group and the specified executable file information included in the first image file.

In an implementation, the step of detecting whether there is specified executable file information in the task description file includes:
  detecting whether an executable file field in the task description file is in an unset state, and if yes, determining that there is no specified executable file information in the task description file.

In an implementation, the unset state includes that a field value is a null value, or a field value is a preset value identifying that the field value is unavailable.

In an implementation, the method further includes:
  when there is specified executable file information in the task description file, rejecting execution of the to-be-executed task.

In an implementation, the method is performed by a container management platform.

In an implementation, the container management platform includes an admission layer and a management layer.

The admission layer receives the submitted task description file for the to-be-executed task, where the task description file includes the first identifier of the first image file; when it is determined that the first identifier is in the whitelist, detects whether there is specified executable file information in the task description file; and if there is no specified executable file information in the task description file, sends the task description file to the management layer.

The management layer executes the to-be-executed task based on the container group created by using the task description file and the specified executable file information included in the first image file.

In an implementation, the step of executing the to-be-executed task includes:
  generating a container group description file based on the task description file; and
  executing the to-be-executed task based on a container group created by using the container group description file and the specified executable file information included in the first image file.

In an implementation, the step of executing the to-be-executed task based on a container group created by using the container group description file and the specified executable file information included in the first image file includes:
  creating a container group by using the container group description file, and executing the to-be-executed task based on the container group and the specified executable file information included in the first image file.

In an implementation, the step of executing the to-be-executed task includes:
sending the container group description file to a specified node device, so that the node device creates a container group by using the container group description file, and executes the to-be-executed task by using the container group and the specified executable file information included in the first image file.

In an implementation, the container management platform is further configured to deploy the to-be-executed task to a server and a plurality of service party devices; and the step of executing the to-be-executed task includes:
generating a first container group description file for the server based on the task description file, where the first container group description file includes configuration information for the server;
respectively generating second container group description files for the plurality of service party devices based on the task description file, where the second container group description files respectively include configuration information for the corresponding service party devices; and
respectively sending the plurality of generated container group description files to the corresponding server and service party devices, so that the server and the service party devices create container groups by using the respective container group description files, and execute the to-be-executed task based on the respectively created container groups and the specified executable file information included in the first image file.

According to a second aspect, an embodiment provides a container-based task execution apparatus, including:
a receiving module, configured to receive a submitted task description file for a to-be-executed task, where the task description file includes a first identifier of a first image file; and
an execution module, configured to: when it is determined that the first identifier is in a whitelist, create a container group by using the task description file, and execute the to-be-executed task based on the container group and specified executable file information included in the first image file.

The first identifier is pre-added to the whitelist when it is determined that the specified executable file information included in the first image file is secure.

In an implementation, before the execution module, the apparatus further includes:
a detection module, configured to detect whether there is specified executable file information in the task description file; and if there is no specified executable file information in the task description file, execute the execution module.

In an implementation, the detection module is specifically configured to:
detect whether an executable file field in the task description file is in an unset state, and if yes, determine that there is no specified executable file information in the task description file.

In an implementation, the apparatus further includes a non-execution module, configured to:
when there is specified executable file information in the task description file, reject execution of the to-be-executed task.

In an implementation, the apparatus is deployed in a container management platform; the container management platform is further configured to deploy the to-be-executed task to a server and a plurality of service party devices; and the execution module includes:
a first generation module, configured to generate a first container group description file for the server based on the task description file, where the first container group description file includes configuration information for the server;
a second generation module, configured to respectively generate second container group description files for the plurality of service party devices based on the task description file, where the second container group description files respectively include configuration information for the corresponding service party devices; and
a sending module, configured to respectively send the plurality of generated container group description files to the corresponding server and service party devices, so that the server and the service party devices create container groups by using the respective container group description files, and execute the to-be-executed task based on the respectively created container groups and the specified executable file information included in the first image file.

According to a third aspect, an embodiment provides a container management platform, including an admission layer and a management layer.

The admission layer receives a submitted task description file for a to-be-executed task, where the task description file includes an identifier of a first image file; when it is determined that the first identifier is in a whitelist, detects whether there is specified executable file information in the task description file; and if there is no specified executable file information in the task description file, sends the task description file to the management layer. The first identifier is added to the whitelist when it is determined that specified executable file information included in the first image file is secure.

The management layer executes the to-be-executed task based on a container group created by using the task description file and the specified executable file information included in the first image file.

According to a fourth aspect, an embodiment provides a computer-readable storage medium. The computer-readable storage medium stores a computer program. When the computer program is executed in a computer, the computer is enabled to perform the method in any implementation of the first aspect.

According to a fifth aspect, an embodiment provides a computing device, including a memory and a processor. The memory stores executable code. When the processor executes the executable code, the method in any implementation of the first aspect is implemented.

According to the method and the apparatus provided in the embodiments of this specification, when an execution device receives the task description file for the to-be-executed task, if it is detected that the first image file is in the whitelist, it is considered that security review on the specified executable file information in the first image file succeeds, and corresponding executable file content is secure. When the to-be-executed task is executed in a container, the reviewed specified executable file information in the first image file is used instead of specified executable file information provided in another form, for example, the specified executable file information in the task description file is not used. In this way, when the to-be-executed task is executed in the container, a case in which a malicious executable file is run can be avoided, a malicious task can be effectively blocked, and security of the task executed in the container can be improved.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following descriptions show merely some embodiments of this specification, and a person of ordinary skill in the art can still derive other drawings from these accompanying drawings without creative efforts.

FIG. 3-1 is a schematic diagram of information included in an image file;

FIG. 3-2 is a schematic diagram of a format of a task description file;

DESCRIPTION OF EMBODIMENTS

The solutions provided in this specification are described below with reference to the accompanying drawings.

Figure 1:
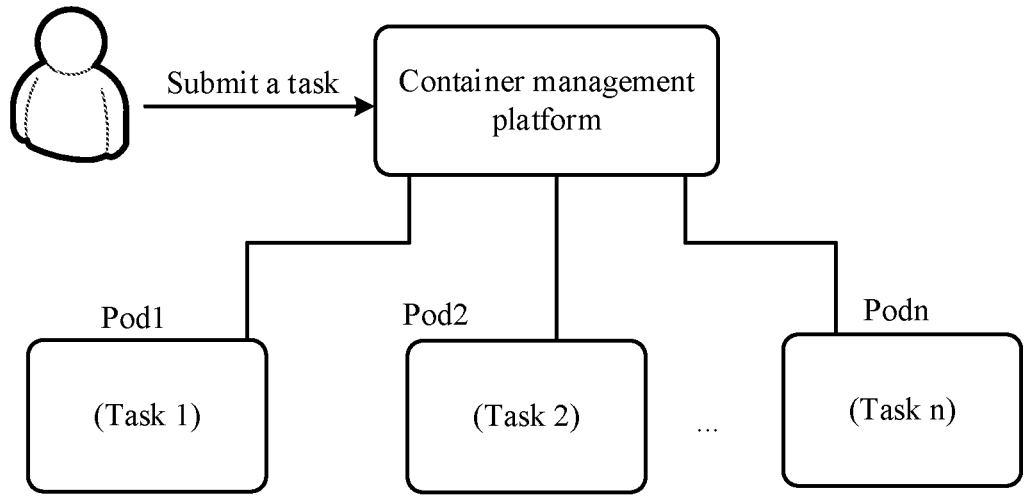
FIG. 1 is a schematic diagram of an implementation scenario in which a to-be-executed task is executed by a container management platform.

FIG. 1 is a schematic diagram of an implementation scenario in which a to-be-executed task is executed by a container management platform. A user submits a task to the container management platform. After confirming security of the task, the container management platform can create a container group (Pod) by using a corresponding command, and run the task in the container group. The container management platform can orchestrate and manage a plurality of container groups to execute a plurality of tasks. A container group Pod1, a container group Pod2, ..., and a container group Podn shown in FIG. 1 constitute a container cluster, and the container management platform can orchestrate and manage the container cluster.

K8s is a container orchestration tool and an automated container operation and maintenance management program, and supports combination of a plurality of hosts into a cluster to run containerized applications. In addition, K8s can automatically create and delete containers, to eliminate many manual operations involved in deploying, scaling, and putting offline mirrored applications. The container management platform can be a device to which a Kubernetes (K8s) environment is applied and that can implement the cluster that includes a plurality of hosts to run containerized applications, and can be briefly referred to as a K8s platform.

In K8s, the container group Pod is a smallest computing unit (or referred to as a scheduling unit or an orchestration unit) that can be created and managed. The container group can include one or more containers, that is, there is a single-container Pod and a multi-container Pod. The container is a carrier for running an application (task), and the application is prepackaged in an image file. Usually, one container runs one image file, and one image file can be placed in a plurality of containers to run. Currently, docker is an implementation of a container technology.

When a user submits a task to the K8s platform, the K8s platform can receive a description file submitted by the user for the task. The K8s platform can automatically allocate a container group (Pod) for the description file to execute the task submitted by the user, and run a corresponding image file in the container group to execute the task. The container is responsible for isolating an internal environment from an external environment, so that an execution process of the task is not affected by the external environment, and effective privacy protection can be performed for the execution process of the task.

In the execution process of the task, the container further invokes privacy data in a service party device, to implement the execution process of the task. However, once the user submits a malicious task or the task submitted by the user is maliciously modified, privacy data of a service party may be disclosed in a process in which the task is executed.

To effectively block a malicious task and improve security in a process of executing a task by a container, this specification provides a container-based task execution method. In the method, an execution device that serves as an execution body performs the following operations: In step S210, a submitted task description file for a to-be-executed task is received, where the task description file includes a first identifier of a first image file. In step S230, when it is determined that the first identifier is in a whitelist, a container group is created by using the task description file, and the to-be-executed task is executed based on the container group and specified executable file information included in the first image file, where the first identifier is added to the whitelist when it is determined that the specified executable file information included in the first image file is secure.

An identifier of an image file whose security detection succeeds can be added to the whitelist. When it is determined that the first identifier is in the whitelist, it is considered that the specified executable file information in the first image file is secure. Therefore, when the to-be-executed task is executed in a container, the specified executable file information that is in the first image file and that is more secure is used. Compared with a manner of using specified executable file information in the task description file, this can avoid a case in which a malicious executable file is run in the container, to effectively block a malicious task and improve security when a task is executed in the container.

To facilitate implementation of a process of blocking the malicious task, after step S210, the container-based task execution method provided in this specification can further include the following steps: Step S220: When it is determined that the first identifier is in the whitelist, detect whether there is specified executable file information in the task description file; and step S230: When it is determined that the first identifier is in the whitelist and it is detected that there is no specified executable file information in the task description file, create a container group by using the task description file, and execute the to-be-executed task based on the container group and the specified executable file information included in the first image file.

By detecting that the identifier of the image file is in the whitelist and that there is no specified executable file information in the task description file, security of the image file can be ensured. In addition, in an execution process of the task, the specified executable file information in the task description file is not used, but instead the specified executable file information that is in the first image file and whose security detection succeeds is used, to further effectively and conveniently block the malicious task, so that all executed tasks are secure, and security of data of a service party is improved.

An execution body of the steps included in the method can be a container management platform, a node device, or another device. The following provides descriptions by using an example in which the container management platform is used as an execution body, and describes a specific implementation of the container management platform in detail.

Figure 2:
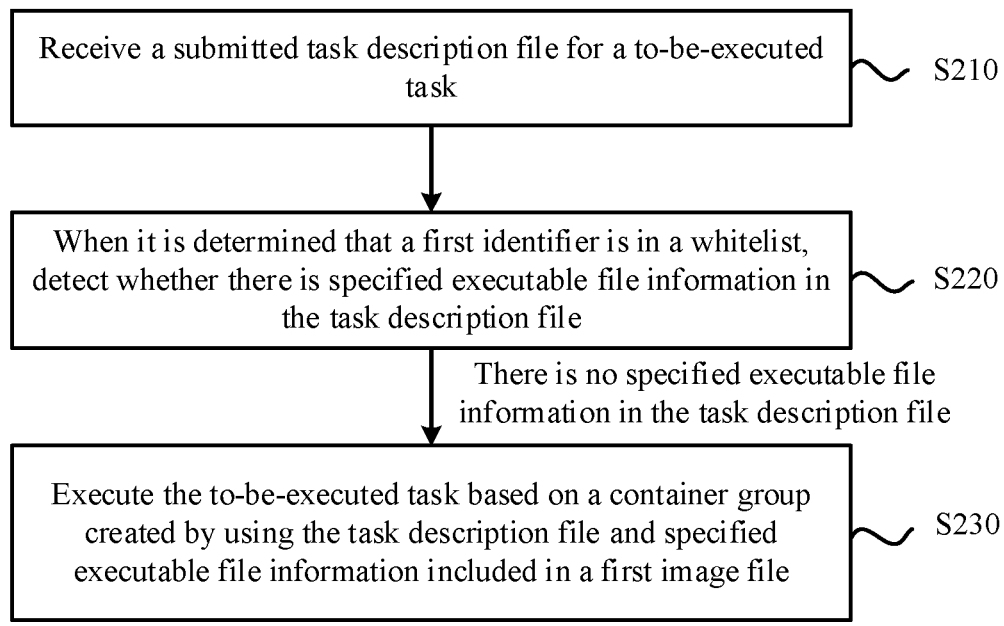
FIG. 2 is a schematic flowchart of a container-based task execution method according to an embodiment.

FIG. 2 is a schematic flowchart of a container-based task execution method according to an embodiment. The method is performed by a container management platform. The container management platform can be implemented by using any apparatus, device, platform, device cluster, or the like that has a computing and processing capability. The method includes steps S210 to S230.

Step S210: The container management platform receives a submitted task description file for a to-be-executed task Job1.

The container management platform can receive the task description file that is for the to-be-executed task Job1 and that is obtained based on an input operation performed by a user. The task description file can be submitted by the user to the container management platform. For example, the container management platform can provide a page that includes a plurality of options to the user, so that the user selects content in a drop-down box of the page and enters information in an input box.

The container management platform can alternatively receive the task description file that is for the to-be-executed task Job1 and that is sent by another device. For example, the another device can be user equipment or a service party device. After obtaining the to-be-executed task Job1 submitted by a user, the another device can submit the corresponding task description file to the container management platform.

The task description file includes a first identifier of a first image file D1. The task description file is a file used to record task information related to the to-be-executed task Job1. The task description file can further include a task name and a task kind of the to-be-executed task, specified executable file information, parameter information of the specified executable file, and the like. The task description file can be a description file for a custom kind task, that is, the user is allowed to submit the custom kind task.

A specified executable file is a key file needed for running the to-be-executed task, and exists in a corresponding first image file. The specified executable file information can include a storage path of the specified executable file in the first image file, and can further include information such as a name of the specified executable file. For example, the specified executable file can be a ".exe" file, a ".sys" file, or a ".dll" file.

The first image file D1 is an image file that is run in a container when the to-be-executed task Job1 is executed. The first image file D1 can include meta information and a file set. The file set includes all files needed for executing the to-be-executed task Job1, and includes an executable file, a configuration file, and a basic library file on which running depends. That is, the file set includes a complete operating system and file system that are needed for running the to-be-executed task Job1. The meta information records basic information about the first image file D1, and includes but is not limited to specified executable file information and parameter information of the specified executable file. The specified executable file information records a path of the specified executable file in the file set. The parameter information records a startup parameter of the specified executable file. It can be learned that both the task description file and the first image file include the specified executable file information and the parameter information of the specified executable file. Usually, the information in the task description file and the first image file is the same.

In actual application, any image file can have a same structure as the first image file. FIG. 3-1 is a schematic diagram of information included in an image file. The image file includes meta information and a file set. The meta information includes specified executable file information and parameter information. The file set includes one or more executable files, a configuration file, and a basic library file. The file set includes a specified executable file.

In a K8s environment, the task description file can be implemented by using a file in a yaml format, the specified executable file information can be represented by using a command field value, and the parameter information of the specified executable file can be represented by using an args field value. FIG. 3-2 is a schematic diagram of a format of a task description file. The task description file specifies a task name (name field), an image file name (image field) used by the task, a specified executable file path (command field) of the task, and parameter information (args field). In addition, the task description file can further include a large amount of other field information, for example, version information (apiVersion field), a description file kind (kind field), metadata (metadata field), and container information (containers field). The foregoing description is merely an example of the task description file, and does not constitute a limitation on this specification.

Then, in step S220, the container management platform can determine whether the first identifier is in a whitelist. When it is determined that the first identifier is in the whitelist, it is detected whether there is specified executable file information in the task description file. If there is no specified executable file information in the task description file, step S230 is performed.

The first identifier can be added to the whitelist when it is determined that the specified executable file information included in the first image file is secure. The first identifier can be pre-added to the whitelist. When the first identifier is in the whitelist and there is no specified executable file information in the task description file, it is considered that the to-be-executed task is secure and is not a malicious task. When the first identifier is not in the whitelist, it is considered that security detection on the first image file fails, and there is an insecure image file. Therefore, execution of the to-be-executed task Job1 can be rejected, and there is no need to detect whether there is specified executable file information in the task description file.

When it is detected that there is specified executable file information in the task description file, it is considered that the to-be-executed task Job1 is insecure, and execution of the to-be-executed task Job1 can be rejected. In this embodiment, the user is not allowed to set the specified executable file information in the task description file, but instead the secure specified executable file information in the image file is allowed to be used, to block a possible malicious task.

When it is detected whether there is specified executable file information in the task description file, it can be detected whether an executable file field in the task description file is in an unset state. If yes, it is determined that there is no specified executable file information in the task description file. If the field is not in the unset state, it is determined that there is specified executable file information in the task description file. The executable file field is, for example, the command field. The unset state includes that a field value is a null value, a field value is a preset value identifying that the field value is unavailable, or the like. For example, a value of 0 or a value of 1 can be preset to indicate that the field value is unavailable. When it is detected that a field value in the command field is 0 or 1, it is considered that the command field is unavailable.

The whitelist is used to record an identifier of an image file that meets security detection. That is, specified executable file information in the image file recorded in the whitelist is secure. The container management platform can obtain the whitelist from another device, or can construct the whitelist by detecting an image file.

For example, before receiving the submitted task description file for the to-be-executed task, the container management platform can receive the submitted first image file, and perform security detection on at least the specified executable file information in the first image file. When the security detection succeeds, the first identifier of the first image file is added to the whitelist, to construct the whitelist. The container management platform can perform security detection on a plurality of image files, and add an identifier of an image file whose detection succeeds to the whitelist.

The first image file can be submitted by the user. The step of performing security detection on the specified executable file information in the first image file can alternatively be performed by a detection device. The user can submit the first image file to the detection device, and the detection device maintains the whitelist. The detection device can store the first image file, or can store the first image file in a storage platform.

The container management platform can obtain the whitelist from the detection device, and determine whether the first identifier is in the whitelist; or may not obtain the whitelist, but send the first identifier to the detection device, and obtain a detection result indicating whether the first identifier fed back by the detection device is in the whitelist.

When security detection is performed on the specified executable file in the first image file, security detection can be specifically performed on an executable file corresponding to the specified executable file field in the first image file. For example, it can be detected whether an executable file corresponding to the command field in the meta information in the first image file is secure. If the executable file is secure, the first identifier of the first image file is added to the whitelist.

When the security detection succeeds, the first image file can be further stored in specified space of the container management platform, or stored in a storage platform used to store the image file.

The image file usually includes many executable files. When security detection is performed on the image file, only the specified executable file, namely, a key executable file, may be detected. For example, only the executable file corresponding to the command field in the meta information is detected.

If security detection on the image file succeeds, security detection on the specified executable file information in the image file succeeds. The image file is stored in a dedicated device. This can ensure, as much as possible, that the specified executable file information is not changed to ensure security of the specified executable file information.

Usually, the task description file also includes the specified executable file information. In a general K8s processing mechanism, when both the task description file and the first image file include the specified executable file information, and when the first image file is run in a container group, the specified executable file information in the task description file is used to run the executable file corresponding to the specified executable file information. In this way, the specified executable file information in the task description file overwrites the specified executable file information in the first image file.

Therefore, when the task description file for the to-be-executed task Job1 is submitted, if the user is allowed to randomly specify an executable file in the task description file, it cannot be ensured whether a secure executable file is run when the to-be-executed task Job1 is executed. Therefore, to avoid a case in which a malicious to-be-executed task is executed, in this embodiment, the user is not allowed to specify an executable file in the task description file, and the specified executable file information that is in the first image file and whose security detection succeeds is used.

The whitelist and the specified executable file information in the task description file are detected, so that security of the to-be-executed task Job1 can be ensured, a case in which a malicious task is executed can be avoided, the original K8s processing mechanism can be better interconnected, and no complex modification to the original K8s processing mechanism needs to be made. In this way, stronger adaptability is implemented.

Then, in step S230, that is, when it is determined that the first identifier is in the whitelist, and there is no specified executable file information in the task description file, the container management platform can execute the to-be-executed task Job1 based on a container group created by using the task description file and the specified executable file information included in the first image file.

When there is no specified executable file information in the task description file, and when the first image file is run in the container group, a specified executable file corresponding to the specified executable file information in the first image file is run. Security detection on the specified executable file succeeds, and the specified executable file is secure.

In this step, the container management platform can execute the to-be-executed task Job1 based on the task description file in an existing manner. For example, the container management platform can generate a container group description file based on the task description file, and execute the to-be-executed task Job1 based on a container group created by using the container group description file and the specified executable file information included in the first image file. Specifically, the specified executable file information included in the first image file can be run in the container group, to run a predetermined computing task and the like, so as to execute the to-be-executed task Job1.

The container group description file is a description file used to create a container group and indicate the container group to run a corresponding task. The container group description file can include information such as the first identifier of the first image file D1, the task name and the task kind of the to-be-executed task, the specified executable file information, the parameter information of the specified executable file, a single-container group, or a multi-container group. The task kind field of the to-be-executed task can be a Pod. The container management platform can correspondingly fill a container group description file that includes a predetermined format with content in the task description file, to generate the container group description file.

The container group description file is generated based on the task description file. When there is no specified executable file information in the task description file, there can be no specified executable file information in the container group description file generated based on the task description file.

In another implementation, there can be specified executable file information in the container group description file, and the specified executable file information is the specified executable file information in the first image file and is obtained from the first image file. In this way, security of the specified executable file information in the container group is ensured.

A process of creating a container group by using the container group description file can be performed in the container management platform, or can be performed in another host (for example, a node device).

Therefore, the container management platform can directly create a container by using the container group description file, and run the to-be-executed task Job1 based on the created container group and the specified executable file information included in the first image file. The container management platform can further send the container group description file to a specified node device. When receiving the container group description file, the node device creates a container based on the container group description file, and executes the to-be-executed task Job1 by using the container group and the specified executable file information included in the first image file.

The container management platform or the node device can create a container group. A device for creating a container group is referred to as a container device. The following describes a specific execution process of the to-be-executed task Job1 by using the container device as an example.

When the to-be-executed task Job1 is executed in the container group, the first image file can be invoked to a corresponding container. The container device can obtain, based on the first identifier of the first image file, the first image file from the storage platform configured to store the image file. If the first image file is preconfigured in specified space of the container device, the container device can directly invoke the first image file into the container from the specified space for running.

The first image file includes an executable file field, and a field value in the executable file field includes the storage path of the specified executable file in the first image file. The container device can read the storage path, obtain the specified executable file from the first image file based on the storage path, and run the specified executable file. When the container group description file includes the specified executable file information, the container device can read the specified executable file information (including the storage path) in the container group description file, obtain the specified executable file from the first image file based on the storage path, and run the specified executable file.

The task description file can include the parameter information of the specified executable file. Provided that it is ensured that the specified executable file is secure, regardless of whether the parameter is provided to the specified executable file by using the task description file or the parameter is provided by using the meta information in the first image file, running of the specified executable file is secure.

Therefore, when running the specified executable file, the container device can use an input parameter of the specified executable file in the task description file, or can obtain the input parameter from the first image file. For example, the input parameter of the specified executable file can be obtained from the args field. The specified executable file is run by using the input parameter.

For example, when the container group description file is generated based on the task description file, and when the task description file includes the input parameter of the specified executable file, the container group description file can be filled with the input parameter; or when the task description file does not include the input parameter of the specified executable file, the input parameter field (args field) in the container group description file can be set to null. When running the specified executable file, the container device can read the input parameter from the container group description file, or can read the input parameter from the first image file.

Based on the foregoing described content, the following describes this embodiment of this specification by using a federated learning scenario as an example. The container management platform can be further configured to deploy the to-be-executed task Job1 to a server and a plurality of (two or more) service party devices. The server and the plurality of service party devices jointly execute the to-be-executed task Job1. The to-be-executed task Job1 can be joint training of a service prediction model. The service prediction model can be used to classify input object feature data. For example, risk classification can be performed on the user, and abnormality classification can be performed on an image. The service party device includes object feature data and a corresponding label. For example, the service party device includes feature data of the user and a label indicating whether the user is a high-risk user, or the service party device includes an image and a label indicating whether there is abnormality in the image. All service data in the service party device is privacy data and cannot be output in a plaintext form.

When the service prediction model is jointly trained, an operation performed by the server is different from an operation performed by the service party device. The service party device can train the service prediction model by using the service data in the service party device, to obtain gradient information used to update a model parameter, and send the gradient information to the server. The server can receive gradient information sent by the plurality of service party devices, aggregate the plurality of pieces of gradient information to obtain aggregated gradient information, and send the aggregated gradient information to the service party device. The service party device updates the model parameter of the service prediction model by using the aggregated gradient information until a model training process converges. It can be learned that when the to-be-executed task Job1 of jointly training the service prediction model is executed, the server and the service party device need to perform different operations. A training process of each party can be performed in a container.

When receiving the task description file for the to-be-executed task Job1, the container management platform can determine whether the first identifier carried in the task description file is in the whitelist, if yes, detect whether there is specified executable file information in the task description file, and if there is no specified executable file information in the task description file, can perform the following steps 1 to 3.

Step 1: Generate a first container group description file for the server based on the task description file, where the first container group description file includes configuration information for the server.

The task description file can include the server and the plurality of service party devices that participate in a joint training task. When the first container group description file is generated, an interaction device that interacts with the server in the joint training task can be determined based on the task description file, and the first container group description file is generated based on the interaction device, so that the first container group description file carries information about the interaction device.

The configuration information for the server can include an image file identifier and other information for the server, and an image file for the server can be a part of the first image file. The first container group description file can further include a restart field. The restart field is used to indicate that when a condition for recreating and running a container is met, an operation of recreating and restarting a container is performed. The restart field in the first container group description file can be set to "Never". In this way, when the server is faulty or training is completed, the joint training task does not need to be re-executed.

Step 2: Respectively generate second container group description files for the plurality of service party devices based on the task description file, where the second container group description files respectively include configuration information for the corresponding service party devices.

For any service party device, when the second container group description file is generated, an interaction device that interacts with the service party device in the joint training task can be determined based on the task description file, and the second container group description file is generated based on the interaction device, so that the second container group description file carries information about the interaction device.

The configuration information for the service party device can include an image file identifier and other information for the service party device, and an image file for the service party device can be a part of the first image file. The second container group description file can include a restart field, and the restart field can be set to "Always". In this way, when the service party device is faulty or there is another case that affects task execution, execution of the joint training task can be restarted.

Step 3: Respectively send the plurality of generated container group description files to the corresponding server and service party devices, that is, send the first container group description file to the server, and respectively send the plurality of second container group description files to the corresponding service party devices. The server and the service party devices can respectively receive the container group description files sent by the container management platform, create container groups by using the respective container group description files, and execute the to-be-executed task Job1 based on the respectively created container groups and the specified executable file information included in the first image file.

In this embodiment, when determining that the task description file and the first image file meet a requirement, the container management platform can generate different container group description files for the server and the service party devices, so that the server and the service party devices can jointly train the service prediction model by using containers.

Figure 4:
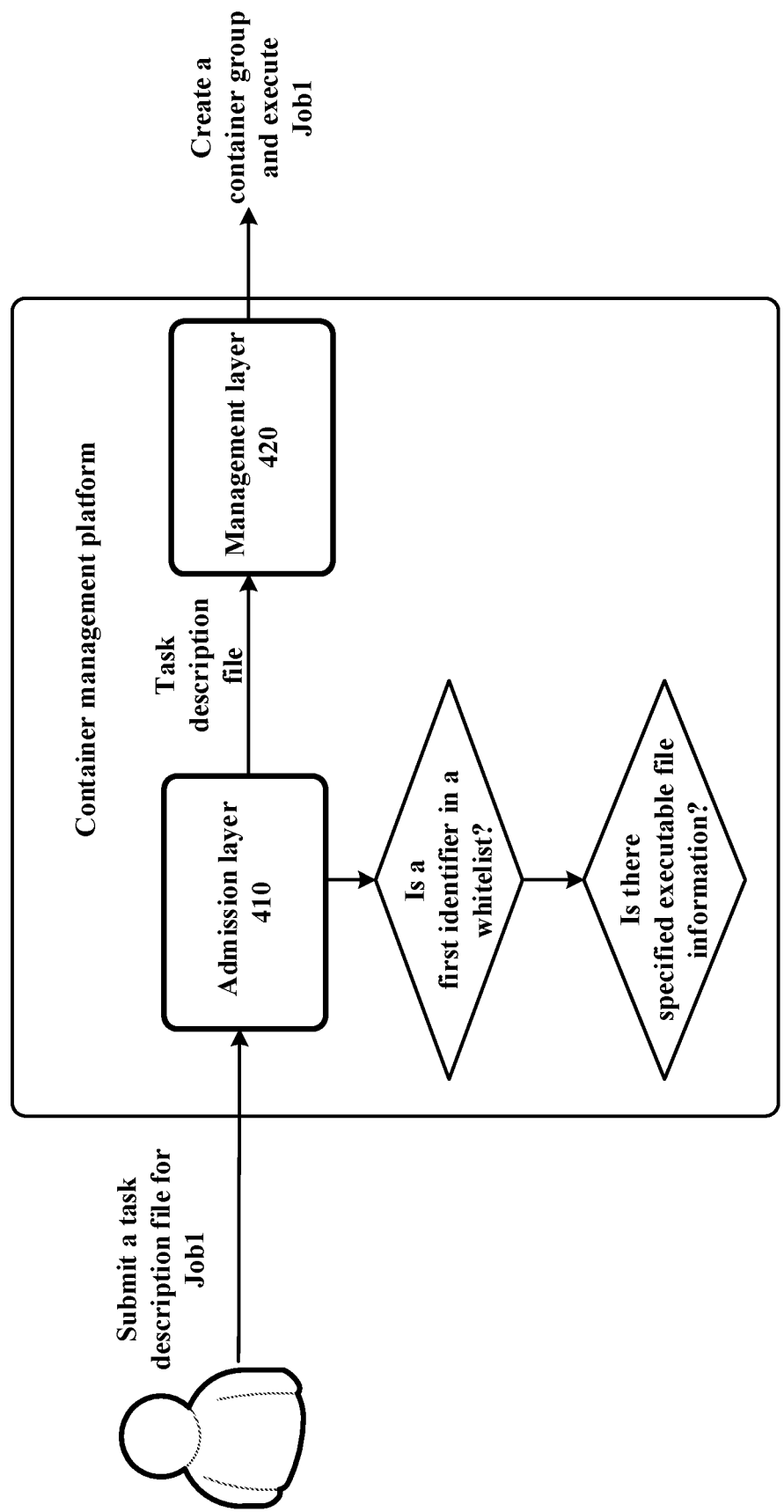
FIG. 4 is another schematic flowchart of a container-based task execution method according to an embodiment.

In another embodiment of this specification, the container management platform can include an admission layer and a management layer. FIG. 4 is another schematic flowchart of a container-based task execution method according to an embodiment.

An admission layer 410 can receive a submitted task description file for a to-be-executed task Job1, where the task description file includes a first identifier of a first image file; when it is determined that the first identifier is in a whitelist, detect whether there is specified executable file information in the task description file; and if there is no specified executable file information in the task description file, send the task description file to a management layer 420. The first identifier is added to the whitelist when it is determined that specified executable file information included in the first image file is secure.

The management layer 420 receives the task description file sent by the admission layer 410, and executes the to-be-executed task Job1 based on a container group created by using the task description file and the specified executable file information included in the first image file.

Specifically, the admission layer 410 can receive the task description file that is for the to-be-executed task Job1 and that is obtained based on an input operation performed by a user; and when it is determined that the first identifier is not in the whitelist, can further reject execution of the to-be-executed task Job1.

The admission layer 410 can detect whether an executable file field in the task description file is in an unset state, and if yes, determine that there is no specified executable file information in the task description file. When there is specified executable file information in the task description file, the admission layer 410 can reject execution of the to-be-executed task Job1.

Before receiving the submitted task description file for the to-be-executed task Job1, the admission layer 410 can receive the submitted first image file, and perform security detection on the specified executable file information in the first image file; and when the security detection succeeds, add the first identifier of the first image file to the whitelist. In an implementation, the foregoing step can alternatively be performed by the management layer 420.

The management layer 420 can generate a container group description file based on the task description file. Then, the management layer 420 can directly create a container group by using the container group description file, and run the to-be-executed task Job1 by using the container group and the specified executable file information included in the first image file.

Alternatively, the management layer 420 can send the container group description file to a specified node device, so that the node device creates a container group by using the container group description file, and executes the to-be-executed task Job1 by using the container group and the specified executable file information included in the first image file.

Alternatively, in a federated learning scenario, the management layer 420 can generate a first container group description file for a server based on the task description file, respectively generate second container group description files for a plurality of service party devices, and respectively send the plurality of generated container group description files to the corresponding server and service party devices, so that the server and the service party devices create containers by using the respective container group description files, and execute the to-be-executed task Job1 based on respectively created container groups and the specified executable file information included in the first image file. The first container group description file includes configuration information for the server, and the plurality of second container group description files respectively include configuration information for the corresponding service party devices.

It should be further noted herein that in this embodiment of this specification, to effectively block a malicious task, it only needs to be ensured that the first identifier is in the whitelist, and when the to-be-executed task Job1 is executed in the container group created based on the task description file, the specified executable file information included in the first image file is used. In specific implementation, an original K8s processing mechanism can be modified based on the foregoing processing procedure, so that each time the to-be-executed task is executed, the execution is based on the reviewed specified executable file information in the image file, to run a secure specified executable file and ensure that the executed task is secure. For example, when the task description file for the to-be-executed task is received and it is determined that the first identifier is in the whitelist, the first image file is obtained, and a container group description file is generated by using the task description file and a specified executable file in the first image file, so that specified executable file information in the container group description file is the specified executable file information in the first image file. A container group is created by using the container group description file, and the specified executable file in the first image file is run based on the container group, so that the to-be-executed task is executed. The foregoing implementation is not unique. In actual application, the foregoing embodiment can alternatively be implemented by using another implementation.

In this specification, "first" in the first image file, the first identifier, and the first container group description file and "second" in this specification are merely intended to facilitate distinguishing and description, and have no limitation meaning.

Specific embodiments of this specification are described above, and other embodiments fall within the scope of the appended claims. In some cases, the actions or steps described in the claims can be performed in a sequence different from that in the embodiments and desired results can still be achieved. In addition, the process depicted in the accompanying drawings does not necessarily need a particular sequence or consecutive sequence to achieve the desired results. In some implementations, multitasking and parallel processing are possible or may be advantageous.

Figure 5:
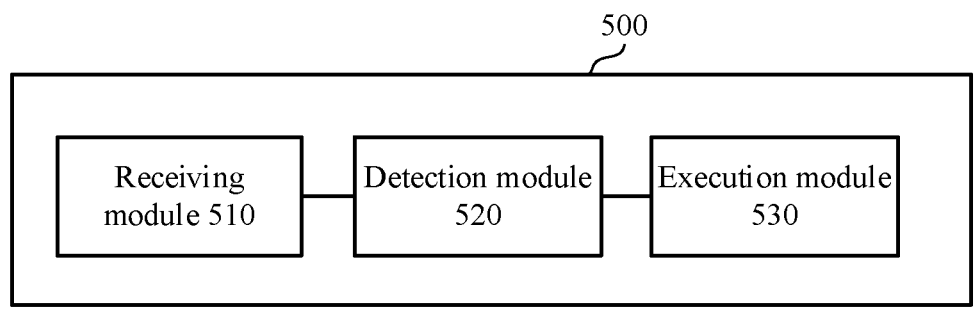
FIG. 5 is a schematic block diagram of a container-based task execution apparatus according to an embodiment.

FIG. 5 is a schematic block diagram of a container-based task execution apparatus according to an embodiment. The apparatus 500 can be deployed in an execution device. The execution device can include a container management platform, a node device, and/or the like. This apparatus embodiment corresponds to the method embodiment shown in FIG. 2. The apparatus 500 includes:
a receiving module 510, configured to receive a submitted task description file for a to-be-executed task, where the task description file includes a first identifier of a first image file; and
an execution module 530, configured to: when it is determined that the first identifier is in a whitelist, create a container group by using the task description file, and execute the to-be-executed task based on the container group and specified executable file information included in the first image file. The first identifier is added to the whitelist when it is determined that the specified executable file information included in the first image file is secure.

In an implementation, the receiving module 510 is specifically configured to:
receive the task description file that is for the to-be-executed task and that is obtained based on an input operation performed by a user.

In an implementation, the apparatus 500 further includes a rejection module (not shown in the figure), configured to:
when it is determined that the first identifier is not in the whitelist, reject execution of the to-be-executed task.

In an implementation, before the execution module 530, a detection module 520 can be further included. The detection module 520 is configured to detect whether there is specified executable file information in the task description file; and if there is no specified executable file information in the task description file, execute the execution module 530.

In an implementation, the apparatus 500 further includes an addition module (not shown in the figure), configured to:
receive the submitted first image file before the submitted task description file for the to-be-executed task is received;
perform security detection on the specified executable file information in the first image file; and
when the security detection succeeds, add the first identifier to the whitelist.

In an implementation, the detection module 520 is specifically configured to:
detect whether an executable file field in the task description file is in an unset state, and if yes, determine that there is no specified executable file information in the task description file.

In an implementation, the unset state includes that a field value is a null value, or a field value is a preset value identifying that the field value is unavailable.

In an implementation, the apparatus 500 further includes a non-execution module (not shown in the figure), configured to:
when there is specified executable file information in the task description file, reject execution of the to-be-executed task.

In an implementation, the apparatus 500 can be deployed in a container management platform.

In an implementation, the execution module 530 includes:
a generation submodule (not shown in the figure), configured to generate a container group description file based on the task description file; and
an execution submodule (not shown in the figure), configured to execute the to-be-executed task based on a container group created by using the container group description file and the specified executable file information included in the first image file.

In an implementation, the execution submodule is specifically configured to:
create a container group by using the container group description file, and execute the to-be-executed task based on the container group and the specified executable file information included in the first image file.

In an implementation, the execution submodule is specifically configured to:
send the container group description file to a specified node device, so that the node device creates a container group by using the container group description file, and executes the to-be-executed task by using the container group and the specified executable file information included in the first image file.

In an implementation, the container management platform is further configured to deploy the to-be-executed task to a server and a plurality of service party devices; and the execution module 530 includes:

a first generation module (not shown in the figure), configured to generate a first container group description file for the server based on the task description file, where the first container group description file includes configuration information for the server;

a second generation module (not shown in the figure), configured to respectively generate second container group description files for the plurality of service party devices based on the task description file, where the second container group description files respectively include configuration information for the corresponding service party devices; and a sending module (not shown in the figure), configured to respectively send the plurality of generated container group description files to the corresponding server and service party devices, so that the server and the service party devices create container groups by using the respective container group description files, and execute the to-be-executed task based on the respectively created container groups and the specified executable file information included in the first image file.

Figure 6:
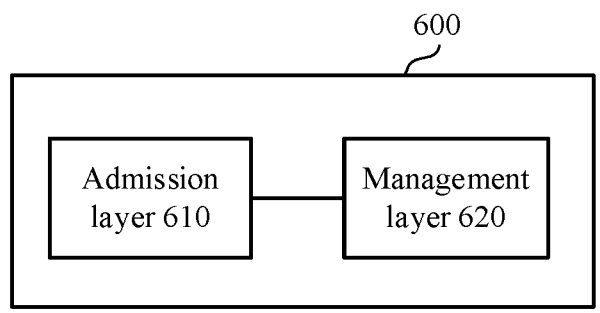
FIG. 6 is a schematic block diagram of a container management platform according to an embodiment.

FIG. 6 is a schematic block diagram of a container management platform according to an embodiment. The container management platform 600 includes an admission layer 610 and a management layer 620.

The admission layer 610 receives a submitted task description file for a to-be-executed task, where the task description file includes a first identifier of a first image file; when it is determined that the first identifier is in a whitelist, detects whether there is specified executable file information in the task description file; and if there is no specified executable file information in the task description file, sends the task description file to the management layer 620. The first identifier is added to the whitelist when it is determined that specified executable file information included in the first image file is secure.

The management layer 620 receives the task description file sent by the admission layer 610, and executes the to-be-executed task based on a container group created by using the task description file and the specified executable file information included in the first image file.

The apparatus embodiments and the device embodiments correspond to the method embodiments. For specific descriptions, references can be made to the descriptions in the method embodiments. Details are omitted here for simplicity. The apparatus embodiments are obtained based on the corresponding method embodiments, and have the same technical effects as the corresponding method embodiments. For specific descriptions, references can be made to the corresponding method embodiments.

An embodiment of this specification further provides a computer-readable storage medium. The computer-readable storage medium stores a computer program. When the computer program is executed in a computer, the computer is enabled to perform the method in any one of FIG. 1 to FIG. 4.

An embodiment of this specification further provides a computing device, including a memory and a processor. The memory stores executable code. When the processor executes the executable code, the method in any one of FIG. 1 to FIG. 4 is implemented.

The embodiments of this specification are described in a progressive manner. For the same or similar parts of the embodiments, mutual references can be made between the embodiments. Each embodiment focuses on a difference from other embodiments. In particular, the embodiments of the storage medium and the computing device are basically similar to the method embodiments, and therefore are described briefly. For related parts, references can be made to some descriptions in the method embodiments.

A person skilled in the art should be aware that in the foregoing one or more examples, functions described in the embodiments of this specification can be implemented by hardware, software, firmware, or any combination thereof. When being implemented by software, these functions can be stored in a computer-readable medium or transmitted as one or more instructions or code on a computer-readable medium.

It should be understood that the foregoing descriptions are merely specific implementations of the embodiments of this specification, and are not intended to limit the protection scope of this specification. Any modification, equivalent replacement, improvement, or the like made based on the technical solutions of this specification shall fall within the protection scope of this specification.

What is claimed is:

1. A container-based task execution method, comprising:
   receiving a submitted task description file for a to-be-executed task, wherein the task description file comprises a first identifier of a first image file;
   upon determining that the first identifier is in a whitelist, detecting whether there is specified executable file information in the task description file, wherein the first identifier is added to the whitelist in accordance with a determination that specified executable file information comprised in the first image file is secure;
   upon detecting that there is no specified executable file information in the task description file, creating a container group by using the task description file, and executing the to-be-executed task based on the container group and the specified executable file information comprised in the first image file.

2. The method according to claim 1, wherein receiving the submitted task description file for the to-be-executed task comprises:
   receiving the task description file that is for the to-be-executed task and that is obtained based on an input operation performed by a user.

3. The method according to claim 1, further comprising:
   upon determining that the first identifier is not in the whitelist, rejecting execution of the to-be-executed task.

4. The method according to claim 1, wherein detecting whether there is specified executable file information in the task description file comprises:
   detecting whether an executable file field in the task description file is in an unset state, and upon detecting that the executable file field in the task description file is in the unset state, determining that there is no specified executable file information in the task description file.

5. The method according to claim 4, wherein the unset state comprises that a field value is a null value, or the field value is a preset value identifying that the field value is unavailable.

6. The method according to claim 1, further comprising:
   upon detecting that there is specified executable file information in the task description file, rejecting execution of the to-be-executed task.

7. The method according to claim 1, wherein the method is performed by a container management platform.

8. The method according to claim 7, wherein the container management platform comprises an admission layer and a management layer;
the admission layer receives the submitted task description file for the to-be-executed task, wherein the task description file comprises the first identifier of the first image file; upon determining that the first identifier is in the whitelist, detects whether there is specified executable file information in the task description file; and upon detecting that there is no specified executable file information in the task description file, sends the task description file to the management layer; and
the management layer executes the to-be-executed task based on the container group created by using the task description file and the specified executable file information comprised in the first image file.

9. The method according to claim 7, wherein executing the to-be-executed task comprises:
generating a container group description file based on the task description file; and
executing the to-be-executed task based on the container group created by using the container group description file and the specified executable file information comprised in the first image file.

10. The method according to claim 9, wherein executing the to-be-executed task based on the container group created by using the container group description file and the specified executable file information comprised in the first image file comprises:
creating the container group by using the container group description file, and executing the to-be-executed task based on the container group and the specified executable file information comprised in the first image file.

11. The method according to claim 9, wherein executing the to-be-executed task comprises:
sending the container group description file to a specified node device, so that the node device creates the container group by using the container group description file, and executes the to-be-executed task by using the container group and the specified executable file information comprised in the first image file.

12. The method according to claim 7, wherein the container management platform is further configured to deploy the to-be-executed task to a server and a plurality of service party devices; and executing the to-be-executed task comprises:
generating a first container group description file for the server based on the task description file, wherein the first container group description file comprises configuration information for the server;
respectively generating second container group description files for the plurality of service party devices based on the task description file, wherein the second container group description files respectively comprise configuration information for corresponding service party devices;
sending the plurality of generated container group description files to the corresponding server and service party devices, so that the server and the service party devices create container groups by using the respective container group description files, and execute the to-be-executed task based on the respectively created container groups and the specified executable file information comprised in the first image file.

13. A computing device comprising:
a memory, and
a processor coupled to the memory, the processor configured to execute a container management platform, including an admission layer and a management layer, wherein
the admission layer is configured to receive a submitted task description file for a to-be-executed task, wherein the task description file comprises an identifier of a first image file; upon determining that the first identifier is in a whitelist, detects whether there is specified executable file information in the task description file; and upon detecting that there is no specified executable file information in the task description file, sends the task description file to the management layer, wherein the first identifier is added to the whitelist upon determining that specified executable file information comprised in the first image file is secure; and
the management layer is configured to execute the to-be-executed task based on a container group created by using the task description file and the specified executable file information comprised in the first image file.

14. A non-transitory computer-readable storage medium comprising instructions stored therein that, when executed by a processor of a computing device, cause the processor to:
receive a submitted task description file for a to-be-executed task, wherein the task description file comprises a first identifier of a first image file;
upon determining that the first identifier is in a whitelist, detect whether there is specified executable file information in the task description file, wherein the first identifier is added to the whitelist in accordance with a determination that specified executable file information comprised in the first image file is secure;
upon detecting that there is no specified executable file information in the task description file, create a container group by using the task description file, and execute the to-be-executed task based on the container group and the specified executable file information comprised in the first image file.

15. The non-transitory computer-readable storage medium of claim 14, wherein receiving a submitted task description file for a to-be-executed task comprises:
receiving the task description file that is for the to-be-executed task and that is obtained based on an input operation performed by a user.

16. The non-transitory computer-readable storage medium of claim 14, wherein the instructions when executed by the processor, further cause the processor to:
upon determining that the first identifier is not in the whitelist, reject execution of the to-be-executed task.

17. The non-transitory computer-readable storage medium of claim 14, wherein detecting whether there is specified executable file information in the task description file comprises:
detecting whether an executable file field in the task description file is in an unset state, and
upon detecting that the executable file field in the task description file is in the unset state, determining that there is no specified executable file information in the task description file.

18. The non-transitory computer-readable storage medium of claim 17, wherein the unset state comprises that a field value is a null value, or a field value is a preset value identifying that the field value is unavailable.

19. The non-transitory computer-readable storage medium of claim 17, wherein the instructions when executed by the processor, further cause the processor to:

upon detecting that there is specified executable file information in the task description file, reject execution of the to-be-executed task.

20. A computing device, comprising a memory and a processor, wherein the memory stores executable instructions that, in response to execution by the processor, cause the processor to:

receive a submitted task description file for a to-be-executed task, wherein the task description file comprises a first identifier of a first image file;

upon determining that the first identifier is in a whitelist, detect whether there is specified executable file information in the task description file, wherein the first identifier is added to the whitelist in accordance with a determination that specified executable file information comprised in the first image file is secure;

upon detecting that there is no specified executable file information in the task description file, create a container group by using the task description file, and execute the to-be-executed task based on the container group and the specified executable file information comprised in the first image file.

* * * * *